US012566977B2

(12) United States Patent
Saxena et al.

(10) Patent No.: US 12,566,977 B2
(45) Date of Patent: Mar. 3, 2026

(54) OPTIMIZING CogBot RETRAINING

(71) Applicant: International Business Machines Corporation, Armonk, NY (US)

(72) Inventors: Rajesh Kumar Saxena, Maharashtra (IN); Harish Bharti, Pune (IN); Rakesh Shinde, Pune (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 17/738,053

(22) Filed: May 6, 2022

(65) Prior Publication Data

US 2023/0359908 A1     Nov. 9, 2023

(51) Int. Cl.
G06N 5/04          (2023.01)
G06N 5/025         (2023.01)
G06N 5/043         (2023.01)

(52) U.S. Cl.
CPC ............. G06N 5/025 (2013.01); G06N 5/043 (2013.01)

(58) Field of Classification Search
CPC ...................................................... G06N 7/01
See application file for complete search history.

(56) References Cited

U.S. PATENT DOCUMENTS 10,343,279  B2    7/2019  Weng
2017/0091664  A1 *  3/2017  Sanchez ................. G06N 20/00
2017/0372221  A1 *  12/2017  Krishnamurthy ........ G06N 7/01
2018/0232657  A1 *  8/2018  Acharya ................ G06Q 10/10
2020/0344185  A1 *  10/2020  Singaraju .............. G06N 3/008

OTHER PUBLICATIONS

Malchanau et al ("Towards Integration of Cognitive Models in Dialogue Management: Designing the Virtual Negotiation Coach Application" 2018) (Year: 2018).*
"CogBot Virtual Agents for the Enterprise", CogAbility, downloaded from the Internet on Feb. 9, 2022, 3 pages, <https://cogability.com/cogbot/>.
"Cognitive Platform", downloaded from the Internet Feb. 9, 2022, 5 pages, provided by searcher in search report dated Jan. 18, 2022, <https://www.cognub.com/index.php/cognitive-computing/>.
Gao et al., "Robust Conversational AI with Grounded Text Generation", 45 pages, arXiv:2009.03457v1 [cs.AI] Sep. 7, 2020.

(Continued)

*Primary Examiner* — Lut Wong
(74) *Attorney, Agent, or Firm* — Stephen R. Yoder

(57)          ABSTRACT

The continual retraining of Cognitive Bots ("CogBots") allows for the adaptation and evolution to ever changing environments. In this retraining process a CogBot response model continually searches the response space for potential responses in which it may shift. An approach for optimizing such retraining of CogBots may be presented herein. The approach may include receiving a prompt at a CogBot retraining framework. The approach may include analyzing the prompt and determining potential responses to the prompt. The approach may include generating a dialogue benchmark for each of the potential responses. The approach may further include generating a decision shift score for the prompt. Further, the approach may additionally include updating the CogBot retraining framework based on the generated decision shift score.

15 Claims, 5 Drawing Sheets

200

202
Calculating dialogue benchmarks for the prompt

204
Determining a shift decision score for the prompt

206
Updating the CogBot response model

(56) References Cited

OTHER PUBLICATIONS

Mell et al., "The NIST Definition of Cloud Computing", Recommendations of the National Institute of Standards and Technology, NIST Special Publication 800-145, Sep. 2011, 7 pages.

Van Vilsteren et al., "The Self-Learning IBM Watson Chatbot", provided by searcher in search report dated Jan. 18, 2022, 13 pages, <https://www.insingdesign.nl/pdf/watson.pdf>.

Vane et al., "Cognitive Automation Solves Many AI-Hard Problems", 2006, 5 pages.

* cited by examiner

200

202
Calculating dialogue benchmarks for the prompt

204
Determining a shift decision score for the prompt

206
Updating the CogBot response model

OPTIMIZING CogBot RETRAINING

BACKGROUND OF THE INVENTION

The present invention relates generally to the field of artificial intelligence, and more specifically, to optimized retraining Cognitive Bots ("CogBots").

CogBots are sophisticated virtual agents trained to respond to prompts. CogBots generally are trained in natural language processing and continually search for correct responses to prompts. Continual learning is a necessary requirement for CogBots, as it increases performance and allows for the adaptation of the CogBot to an ever changing environment. CogBots have been utilized in many different technology and education spaces, including multilingual models, and responding to questions posed by a human or simulated user. Due to the necessity of ever evolving prompts, CogBots are continuously searching for new and better answers within the space it has been trained. CogBots then review past responses to prompts to better direct prompts to higher dialog benchmarks. This conventional reinforcement training model continually checks the current state of the CogBot knowledge and responses and provides rewards or maximizes rewards to the CogBot for correct or more correct responses to prompts.

SUMMARY

Embodiments of the present disclosure may include a computer-implemented method, a computer system, and a computer program product for optimizing CogBot retraining. Embodiments of the invention may include receiving a prompt at a CogBot response model. Further, embodiments of the invention may include analyzing the prompt. Additionally, embodiments of the invention may include generating one or more potential decisions for the prompt, based at least in part on analyzing the prompt. Also, embodiments of the invention may include calculating a dialogue benchmark for each of the one or more potential decisions. Further, embodiments of the invention may include determining a shift decision score for the prompt. Embodiments of the invention may include updating the CogBot response model based at least in part on the shift decision score.

It should be understood, the above summary is not intended to describe each illustrated embodiment of every implementation of the present disclosure.

Figure 1:
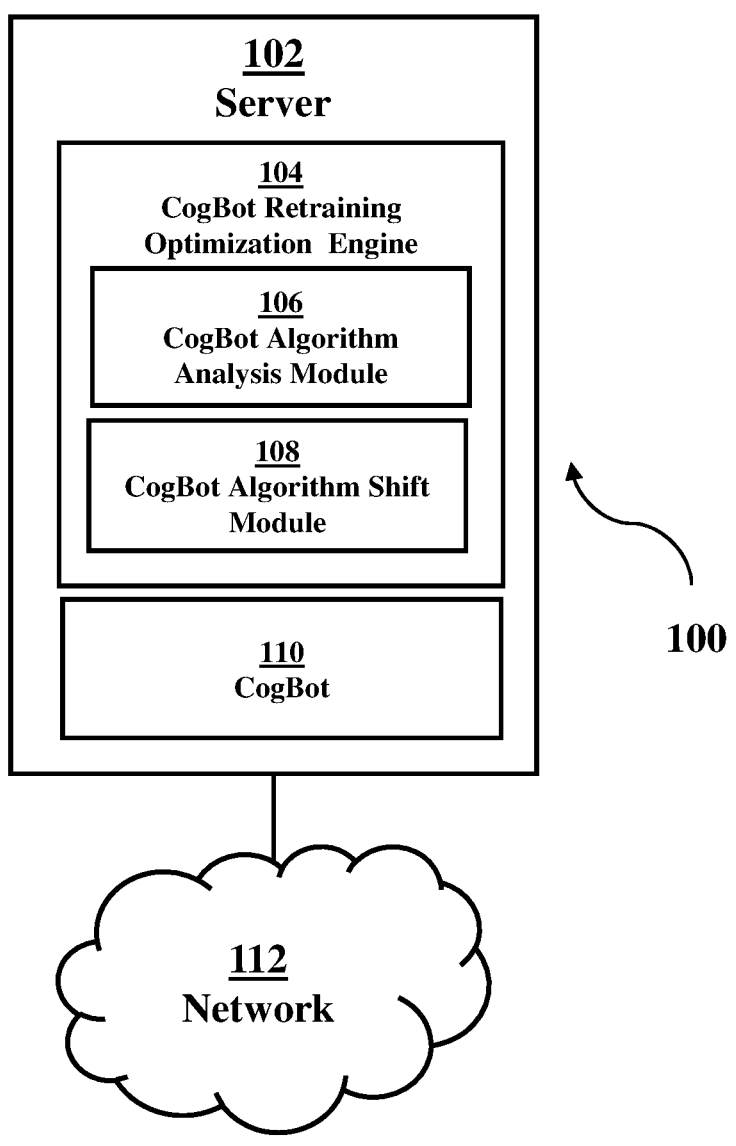
FIG. 1 is a functional block diagram of a CogBot retraining optimization system, generally designated 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

A critical aspect of a CogBot is the ability to enhance its' knowledge base to improve its' responses to prompts. A framework based on comprehension of the retraining within the latent space based on a shift algorithm is necessary to allow a CogBot to retrain and improve its' responses to prompts effectively and efficiently. The framework can provide an understanding of behaviors associated with shift algorithms under different decision conditions including unnecessary shifts and missing shifts, both of which result in decreased dialogue effectiveness.

In an embodiment, a CogBot retraining framework generates a decision shift score in response to a prompt to retrain a CogBot. The decision shift score can be a quantitative value which corresponds to the tendency of the CogBot to shift into responses which do not increase the overall dialogue benchmark of the CogBot's response given the immediate prompt event. The decision shift score can be utilized to update a CogBot's retraining shift algorithm, so it is more likely or less likely to shift to a different response during the retraining process. Throughout this specification, the term shift is used to describe shifting a response to a prompt or a category of prompts within the search space of a CogBot's knowledge base. In other words, the shift can be described as a "left" shift on a Johari window of the CogBot's knowledge base, which has open or known area, blind area, unknown area, and hidden area. The open or known area is known to the CogBot. The blind area may be known by users, but not the CogBot and is to the left of the unknown area, hence a "left shift" which is expected to generate a more correct or better response than that of one in the known or open area. The hidden area is trained space known by the CogBot, but not users. Finally, regarding the Johari window, the unknown area is unknown to the CogBot and the user. Typically, a response which shifts into the blind area will result in a more correct or better decision. Please note, the Johari model is to be taken as a non-limiting example of potential shifts and is for description purposes only.

In an embodiment, a decision shift score can be based on comprehending shift behaviors and can include determining a wrong decision probability ("WDP"). A WDP is the overall probability of an incorrect shift to a decision by a CogBot under a shift retraining algorithm. The WDP can be a combination of the probability of a missing shift and an unnecessary shift for a shift algorithm. An unnecessary shift is an event when a CogBot shifts to a different decision, however, the new decision is unable to satisfy the mandate requirement of the following time period. A missing shift is an event when a CogBot stays at the present decision, however, the present decision is unable to satisfy the mandated requirement, while other decision options would have been able to satisfy the mandated requirement. Additionally, in an embodiment, a shift probability can be calculated for the shift decision score. The shift probability is the overall chance a CogBot will shift or not shift to a response that results in a lower dialogue benchmark.

Embodiments may include a framework to capture unnecessary behaviors of the subject (e.g., the CogBot operates within the framework). For example, if a CogBot observes that a subject involves a decision that is incorrect, it is classified as an unnecessary shift. In another example, if a CogBot observes the subject does not shift into a different decision, it is classified as a missing shift. A non-limiting example of such a framework can be constructed as a gilbert model in which the probabilities of a missing shift and an unnecessary shift are determined as a Poisson process (e.g., the subject has N instances of when a CogBot can decide to move into a correct decision). In an embodiment, the model can determine the tendency of the CogBot to move into a different decision (e.g., state) and the tendency of the CogBot to stay in a decision (e.g., state) which will result in a lower dialogue benchmark.

Embodiments of the present invention appreciate the need to retrain a control master based on shift behaviors. Shift algorithms are the training algorithms that are used to continually update the responses of a CogBot. The goal of a shift algorithm is to increase the reward and ultimately the dialogue benchmark of responses to prompts. While Cog-Bots have made extensive advancements over the past few years, training CogBots continues to be a costly and time consuming process. Missteps in the training process contribute to increased resource use during the training process. A misstep is a wrong decision to adjust the behaviors of the CogBot. A wrong decision can be a shift in the wrong direction of the hidden space or no movement at all within the hidden space during adjustments during the training process. Further, in an effort to reduce unnecessary shifts (e.g., shifts that do not result in an increase in dialogue benchmark), a CogBot will tend to reduce shift times (e.g., the timeframe between shifts within the latent space). On the other hand, CogBots will extend the shift time in an attempt to reduce a missing shift (e.g., not shifting response space to a response that would increase dialogue benchmark). What is needed is the ability to better understand the behaviors of shift algorithms under different decision conditions for retraining a CogBot.

The embodiments depicted herein are for optimization of CogBot retraining. In an embodiment, a CogBot can receive a prompt relating to a space in which the CogBot has been trained. A CogBot retraining optimization model can analyze the prompt and the current response which the CogBot will provide to the prompt. The retraining optimization model can be an analytical model with a framework to capture and enhance responses of the CogBot it is monitoring. Based on the analysis of the current response, the optimization model can determine an incorrect shift or lack of a shift in the state of the CogBot.

In an embodiment, in response to a prompt the retraining optimization model can determine the probability of an unnecessary shift in response to a prompt. An unnecessary shift is a shift to a different decision than previously used to the prompt. It is called an unnecessary shift because it results in a lower dialog benchmark. A lower dialog benchmark is associated with the correctness of a response to a prompt. For example, a user may provide a prompt "Which major league baseball team won the 1990 world series?" An ideal answer would be "The Cincinnati Reds." The CogBot may have the present response "The Reds". An unnecessary shift would be "Cincinnati", as it is a correct response, however, it does not provide an answer in the form of a baseball team, rather it changes the response to that of a city. Therefore, the result would be a decreased dialog benchmark.

In an embodiment, the retraining optimization model can determine a shift probability. A shift probability is the probability the CogBot will not shift the response to a prompt when the shift would cause an increase in dialog benchmark (henceforth a "missing shift". For example, a user may provide a prompt "when was Theodore Roosevelt President of the United States?" While the current response might be Theodore Roosevelt was president in 1901, the shift response might be "Theodore Roosevelt was president from 1901 to 1909." It would be a missing shift for the CogBot not to move to the new response, as it would provide an increased dialogue benchmark.

Embodiments may also include the utilization of a retraining optimization model as the framework in which a CogBot or virtual agent can engage in reinforcement training. The retraining optimization model can simultaneously determine an unnecessary shift or a missing shift probability. Utilizing a missing shift probability and an incorrect shift probability, a wrong decision score can be generated utilizing the current state of the CogBot response. In an embodiment, the wrong decision score can be compared to a dynamically determined dialogue benchmark threshold for changing the response state of the CogBot. In an embodiment, the determined dialogue benchmark threshold can be the mandated change of a response by a shift algorithm.

Referring now to the Figures, FIG. 1 is a functional block diagram generally depicting CogBot retraining optimization system 100, in accordance with an embodiment of the invention. CogBot retraining optimization system 100 comprises CogBot retraining optimization engine 104 operational on host device 102. Also depicted in CogBot retraining optimization system 100 is CogBot algorithm analysis module 106 and CogBot algorithm shift module 108. Server 102 can be interconnected to other computing devices (not shown) over network 112.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system such as in cloud computing environment 50 (depicted in FIG. 4). In an embodiment, server 102 can represent a computing system utilizing clustered computers and components (e.g., database server computers, application server computers, etc.) that act as a single pool of seamless resources when accessed within CogBot retraining optimization system 100. In another embodiment, server 102 can be a laptop computer, a tablet computer, a netbook computer, a personal computer, a desktop computer, or any programmable electronic device or combination of programmable electronic devices capable of executing machine readable program instructions and communicating with each other, and other computing devices (not depicted) within CogBot retraining optimization system 100 via network 112. It should be noted, while only a single device is shown in FIG. 1 for server 102 in other embodiments, multiple servers or other computing devices can be present within CogBot retraining optimization system 100.

Figure 3:
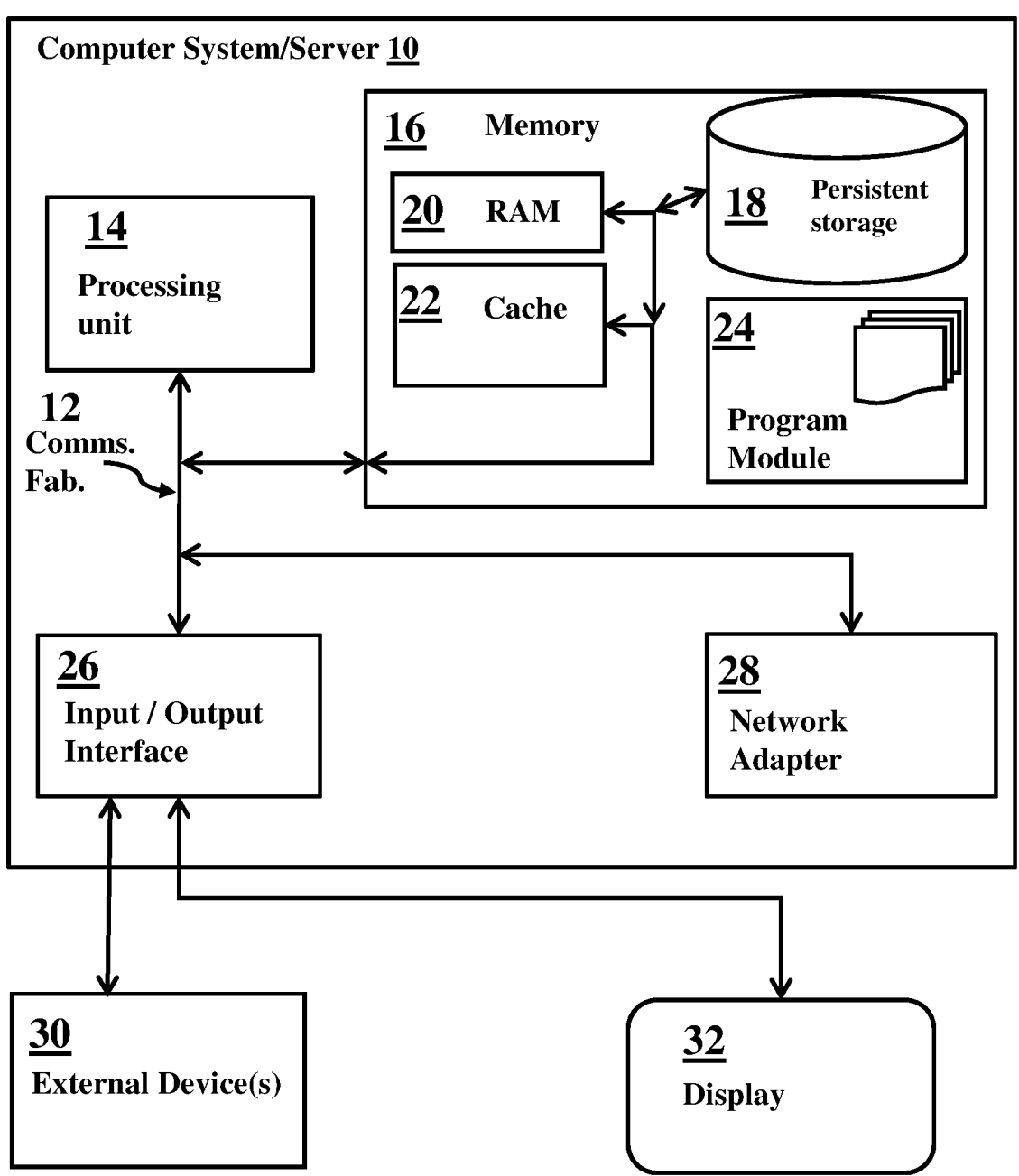
FIG. 3 is a functional block diagram of an exemplary computing system 10 within a CogBot retraining optimization system, in accordance with an embodiment of the present invention.

Server 102 may include components as depicted and described in further detail with respect to computer system 10 in FIG. 3. Server 102 may include components as depicted and described in further detail with respect to cloud computing node 40 of cloud computing environment 50 in FIG. 4.

Network 112 can be a telecommunications network, a local area network (LAN), a wide area network (WAN), such as the Internet, or a combination of the three, and can include wired, wireless, or fiber optic connections. Network 112 may include one or more wired and/or wireless networks that are capable of receiving and transmitting data, voice, and/or video signals, including multimedia signals that include voice, data, and video information. In general, network 112 can be any combination of connections and protocols that will support communications between server 102, and external computing devices (not shown) within CogBot retraining optimization system 100.

CogBot retraining optimization engine 104 is a computer program capable of receiving a prompt for a CogBot, analyzing the potential dialogue responses for the prompt, determining a dialogue benchmark score, and updating (i.e., shifting) the CogBot response to the response with the highest dialogue benchmark score. Determining a dialogue benchmark score can be based on one or more factors (described further below). Further, determining the dialogue benchmark score can involve finding the probability the CogBot will shift into an incorrect decision or not shift into a better or more correct decision. In an embodiment, multiple clones of CogBot retraining optimization engine 104 can be present on the same server or multiple servers within CogBot retraining optimization system 100. For example, CogBot retraining optimization engine 104 may be a program associated with a call center or customer service system in which multiple CogBots are continuously operational and where a primary CogBot operates within ephemeral layer and all other CogBots are replicas of the primary CogBot. Further, a program with CogBot retraining optimization engine 104 can be an application that is configured to operate remotely on a server or cloud based platform (public, hybrid, or private) and communicate with a user via a customer service or virtual assistant application on a mobile device. It should be noted, a secondary or lite version of a CogBot can be stored on a mobile device, in which the secondary version of the CogBot is a model configured to operate within the environment of a mobile device and provide the primary CogBot with prompts in which it will analyze, shift update, and determine a wrong decision probability for the secondary version and relay a decision shift update to the secondary version located on the secondary device, to provide a more customized CogBot to the user.

CogBot algorithm analysis module 106 is a computer module that can receive a prompt and generate one or more responses to the prompt within the decision space. Further, CogBot algorithm analysis module 106 can generate a wrong decision probability score for the response. In an example, CogBot algorithm analysis module 106 can receive a prompt from a user of a mobile computing device. In an embodiment, CogBot 110 can determine potential responses for the prompt. In another embodiment, CogBot algorithm analysis module 106 can determine potential responses to the prompt. The potential responses can then be graded or scored by CogBot algorithm analysis module 106. In an embodiment, the grade or score can be a shift probability or a wrong decision probability for the prompt given the current environment and the knowledge base of CogBot 110. The wrong decision probability is the probability the retraining algorithm of CogBot 110 will shift into a decision that will result in a lower dialogue benchmark score at the next time frame (e.g., when a similar prompt is posed to the CogBot and the CogBot's 110 response will result in a lower dialogue benchmark). In another example, wrong decision probability is the probability the CogBot will not shift into a different decision which could result in a higher benchmark score (e.g., the CogBot has information which it could utilize to provide a more correct or better response and therefore provide a higher dialogue benchmark when posed with a similar prompt but fails to shift into the better response.) It should be noted, CogBot algorithm analysis module 106 can determine or generate the dialogue benchmark score as a Poisson process within a Gilbert model.

In an embodiment, CogBot algorithm analysis module 106 can utilize an analytical model in which it quantifies the probabilities of incorrect shifts or missing shifts as wrong decision probabilities and the change of a shift as a shift probability. For example:

$$\alpha = \sum_{i=1}^{N} \sum_{j=ij\neq i}^{N} Pr\{\Upsilon_{n_j|n_i}\} + \sum_{i=1}^{N} Pr\{\psi_{n_j}\}$$

where "$\alpha$" is the wrong decision probability (WDP) (e.g., the probability of understanding the wrong movement), "$\Upsilon_{n_j|n_j}$;" is the probability of an unnecessary shift which refers to the events that a CogBot decides to move to the other decision, but the new decision cannot satisfy its mandated requirement in a next time period, and $\psi_{n_j}$, is the probability of a missing shift which refers to the events that a CogBot decides to stay at its present decision, but this decision cannot satisfy its mandated requirement while the other decision can satisfy, "i" is the current response and "j" is [the] a potential response at a future point in time.

CogBot algorithm shift module 108 is a computer module that can be configured to update (i.e., shift) CogBot's 110 response to a prompt, based off the dialogue benchmark score of the generated potential responses to the prompt. For example, if a dialogue benchmark score for a response for the following time point (e.g., $t_2$) is above a threshold, CogBot algorithm shift module 108 can update CogBot's 110 response. In another embodiment, CogBot algorithm shift module 108 can explore the potential generated decisions from CogBot algorithm analysis module 106 and discover which type of shift it would be considered within the Johari model (e.g., hidden, unknown, or blind).

In an embodiment, CogBot algorithm shift module 108 can be configured to operate with a feedback loop to update the model or algorithm of a primary CogBot. The model or algorithm can be configured or condensed to operate within a light shell program and pushed out to mobile devices, where the condensed model or algorithm is required to relay all prompts back to the primary CogBot training model for further retraining and learning. The environment or user in which the condensed version is can be a factor in exploring the latent or hidden space in which the CogBot knowledge base can be customized to provide the user or specific environment with a better more user friendly experience.

Figure 2:
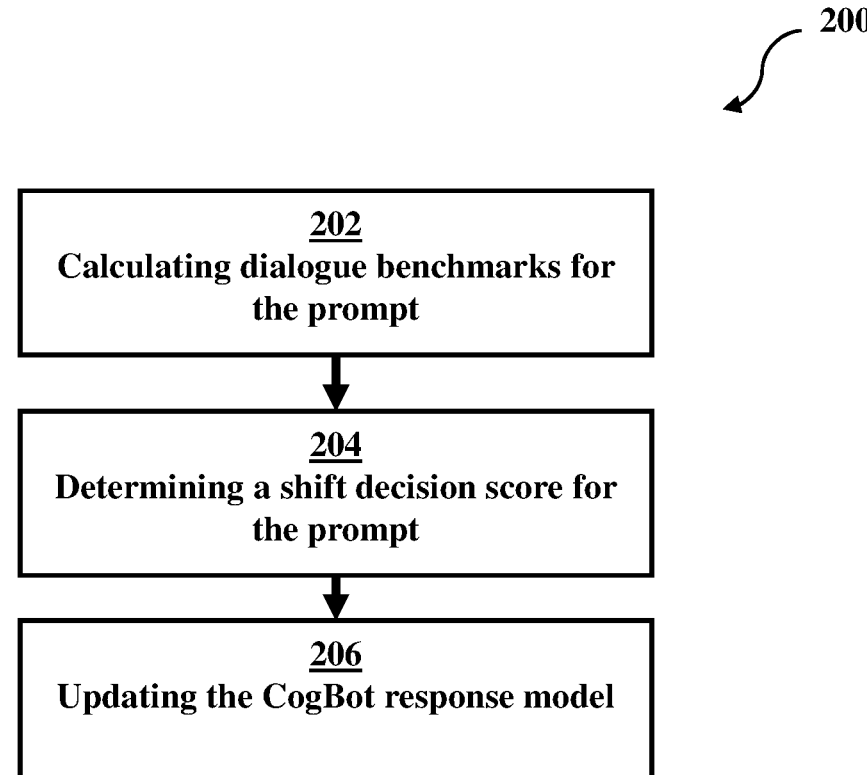
FIG. 2 is a flowchart of a method for CogBot retraining optimization, generally designated 200, in accordance with an embodiment of the present invention.
Figure 2:
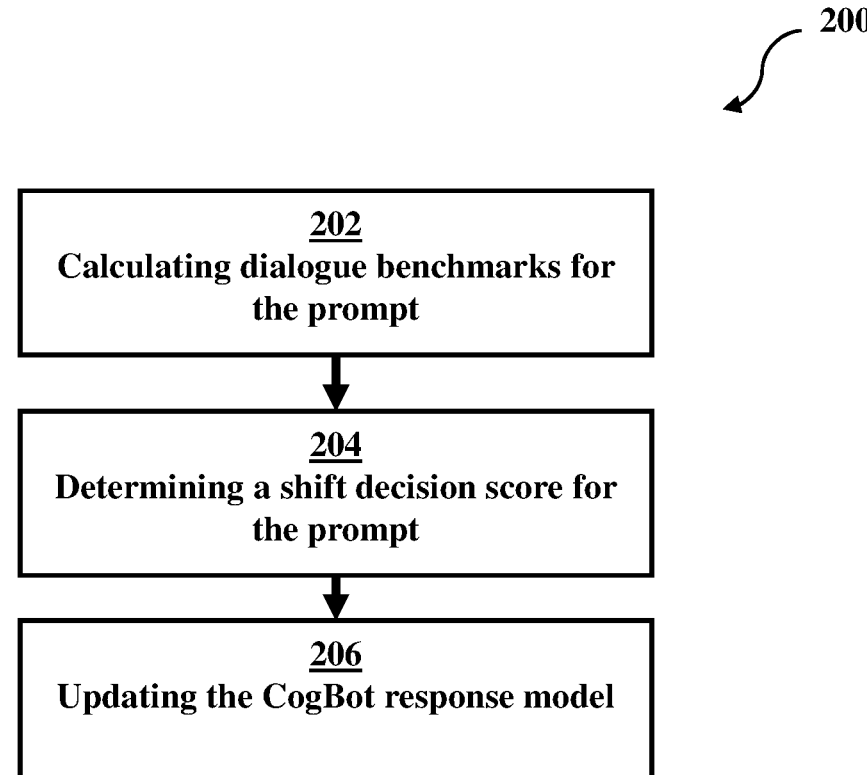

FIG. 2 is a flowchart depicting method 200 for optimizing CogBot retraining. At step 202, CogBot algorithm analysis module 106 can calculate dialogue benchmarks for potential responses to a prompt received by CogBot 110. For example, CogBot algorithm analysis module 106 can receive a prompt received by CogBot 110. CogBot 110 can have a response to the prompt, which it can provide to a user or simulated user. The prompt can be relayed to CogBot retraining optimization engine 104, which houses CogBot algorithm analysis module 106. CogBot algorithm analysis module 106 can generate potential responses to the prompt, based on the CogBot response algorithm. A dialogue benchmark for the generated responses can be a score or determination of the wrongness or correctness (e.g., a user survey to determine if the response addresses the prompt correctly or in a supervised training the percentage of the correctly ordered words in the response) of the generated responses. In an embodiment, the CogBot algorithm analysis module 106 can categorize the location of the responses within the search space. The dialogue benchmark can also be a score of the response in relation to the knowledge base of the CogBot. It should be noted, the score can be an unsupervised or semi-supervised process, where continual learning and/or knowledge accumulation can occur. It should be noted, the dialogue benchmark score can be a dynamically calculated score which can change, or deviate based on the environment or knowledge base of the CogBot. Further, CogBot algorithm analysis module 106 can dynamically determine a dialogue benchmark threshold. A dialogue benchmark threshold is a threshold, which a potential response must meet or exceed to cause the CogBot response to shift to that potential decision.

At step 204, CogBot algorithm analysis module 106 can determine a shift decision score for the potential responses or all of the responses as a whole. The potential responses can be graded or scored as a wrong decision probability. The wrong decision probability or shift decision score can be a quantification of the algorithms potential to shift into an incorrect response or not shift into a response with a higher dialogue benchmark score.

At step 206, CogBot algorithm shift module 108 can update the shift algorithm based on the shift decision score. In an embodiment, algorithm shift module 108 can increase the time between probability timespan of the shift decision score if missing shifts are found to be a threshold score (e.g., >75%). In another embodiment, algorithm shift module 108 can decrease the time between probability timespans of the shift decision score if incorrect shifts are found to be above a threshold score (e.g., >55%). In another embodiment, CogBot algorithm shift module 108 can push a response with a higher dialogue benchmark to the CogBot, wherein the response can be associated with the prompt or a category of prompts. In an embodiment, CogBot algorithm shift module 108 can shift the response of CogBot 110 to the potential response with a dialogue score that meets or exceeds a calculated dialogue threshold.

FIG. 3 depicts computer system 10, an example computer system representative of server 102. Computer system 10 includes communications fabric 12, which provides communications between processing unit 14, memory 16, persistent storage 18, network adaptor 28, and input/output (I/O) interface(s) 26. Communications fabric 12 can be implemented with any architecture designed for passing data and/or control information between processors (such as microprocessors, communications, and network processors, etc.), system memory, peripheral devices, and any other hardware components within a system. For example, communications fabric 12 can be implemented with one or more buses or a crossbar switch.

Memory 16 and persistent storage 18 are computer readable storage media. In an embodiment, memory 16 includes random access memory (RAM) 20. In general, memory 16 can include any suitable volatile or non-volatile computer readable storage media. Cache 22 is a fast memory that enhances the performance of processing unit 14 by holding recently accessed data, and data near recently accessed data, from memory 16.

Program instructions and data used to practice embodiments of the present invention may be stored in persistent storage 18 and in memory 16 for execution by one or more of the respective processing units 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network Adaptor 28, in these examples, provides for communications with other data processing systems or devices. In these examples, network adaptor 28 includes one or more network interface cards. Network Adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface(s) 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor, touchscreen, and/or augmented virtual reality device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
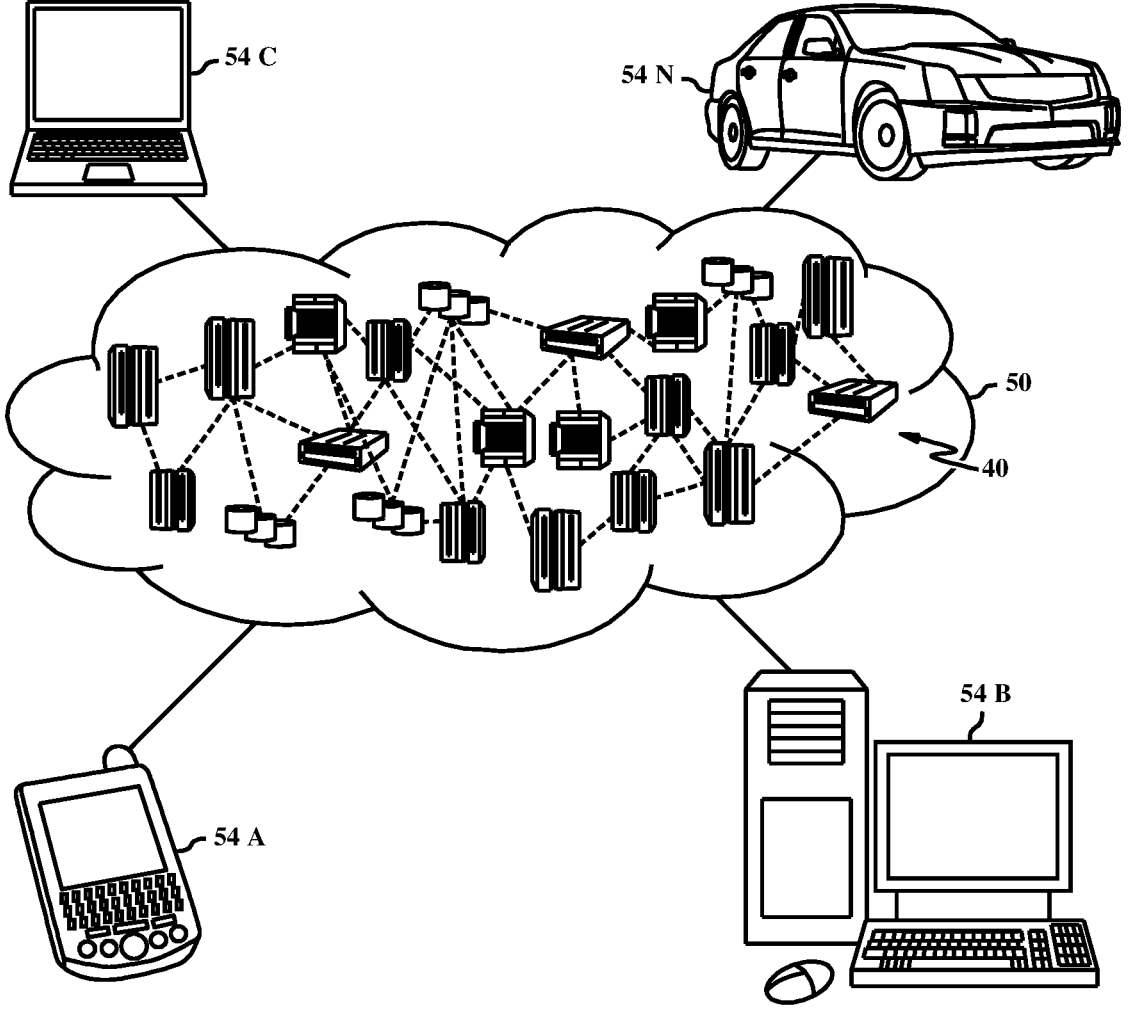
FIG. 4 is a diagram depicting a cloud computing environment 50, in accordance with an embodiment of the present invention.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
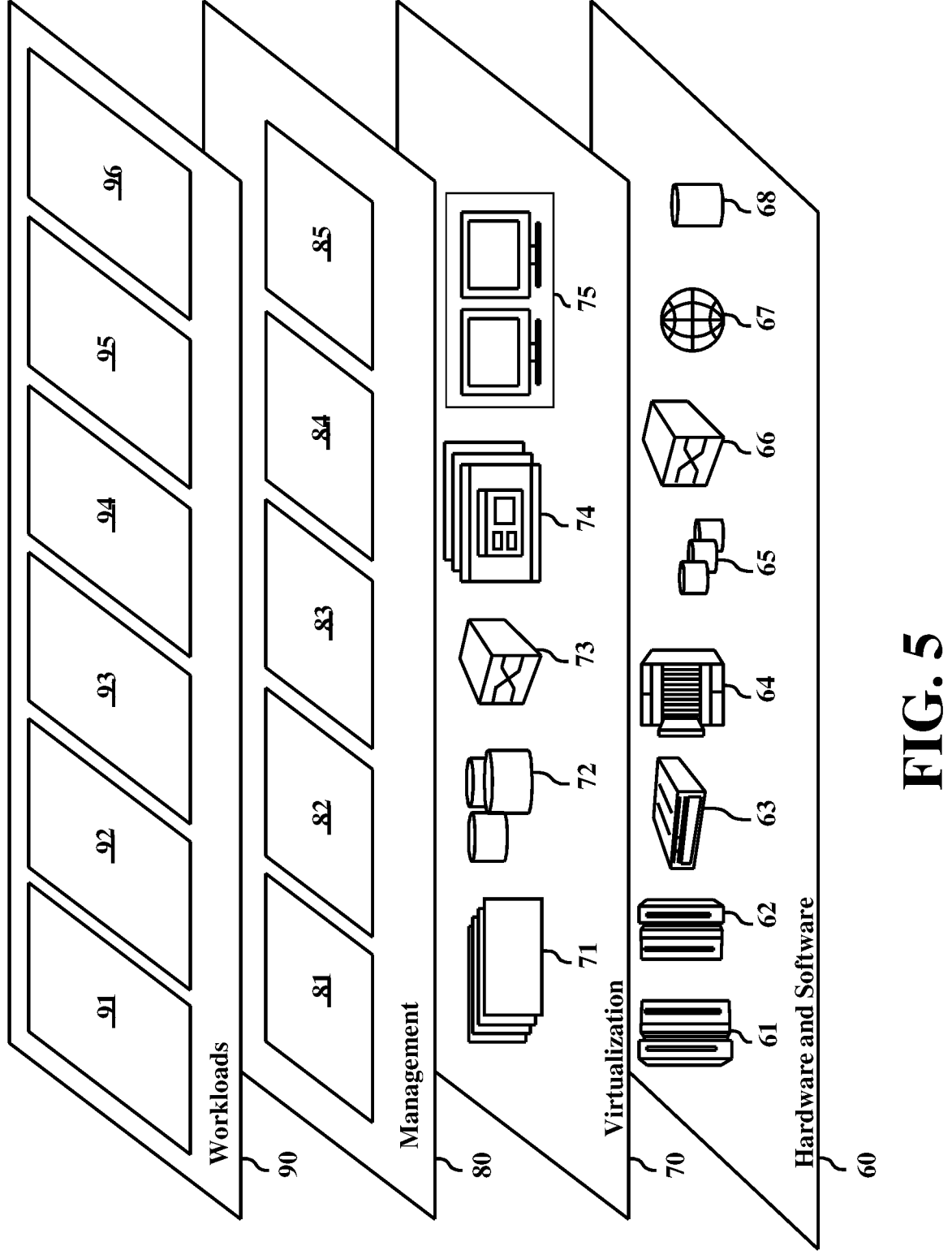
FIG. 5 is a functional block diagram depicting abstraction model layers, in accordance with an embodiment of the present invention.

Referring now to FIG. 5, a set of functional abstraction layers provided by cloud computing environment 50 (depicted in FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and optimized CogBot retraining 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method for optimizing Cognitive Bot (CogBot) retraining, the method comprising:
   establishing a framework for understanding shift behaviors of a CogBot having a retraining shift algorithm for continuous, automated improvement and updating the retraining shift algorithm as needed, the framework including an algorithm analysis module and a retraining optimization module;
   identifying, within the framework, a prompt at a CogBot response model;
   analyzing, by the algorithm analysis module, the prompt and a current response prepared by the CogBot by:
      generating, by the algorithm analysis module, one or more potential decisions for the prompt, based at least in part on analyzing the prompt and the current response; and
      calculating, by the retraining optimization module, a dialogue benchmark for each of the one or more potential decisions with respect to the current response;
   responsive to a first potential decision for the prompt being above a dialogue benchmark threshold, shifting, by the retraining optimization module, the current response to the first potential decision for the prompt, the first potential decision having a highest dialogue benchmark among the one or more potential decisions;
   determining a shift decision score for shifting the current response to the first potential decision; and
   updating the retraining shift algorithm of the CogBot response model based at least in part on the shift decision score.

2. The computer-implemented method of claim 1, wherein determining a shift decision score further comprises:
   generating a wrong decision score for the prompt, based at least in part on the generated one or more potential decisions; and
   generating a shift probability for the prompt.

3. The computer-implemented method of claim 2, wherein determining a wrong decision score further comprises:
   generating an unnecessary shift probability, wherein the unnecessary shift probability is a probability the CogBot shifts to a potential decision with a lower dialogue benchmark.

4. The computer-implemented method of claim 2, wherein determining a wrong decision score further comprises:
   generating a missing shift probability, wherein the missing shift probability is a probability the CogBot fails to shift to a potential decision resulting in a higher dialogue benchmark.

5. The computer-implemented method of claim 1, wherein determining a shift decision score further comprises:
   configuring the one or more potential decisions as a Poisson process, wherein the CogBot has one or more instances to shift into a decision with a dialogue benchmark above a calculated threshold.

6. The computer-implemented method of claim 1, wherein:
   the CogBot is a primary CogBot and the identified prompt and the current response are provided to the primary CogBot by a secondary CogBot stored on a mobile device;
   the framework is operational on a host device, separate from the mobile device; and
   shifting the current response establishes a shift update, which is provided to the secondary CogBot from the host device via the primary CogBot.

7. A computer system for optimizing CogBot retraining, the system comprising:
   a memory; and
   a processor in communication with the memory, the processor being configured to perform operations to:
      establish a framework for understanding behaviors of the CogBot having a retraining shift algorithm for continuous, automated improvement and updating the retraining shift algorithm as needed, the framework including an algorithm analysis module and a retraining optimization module;
      identify, within the framework, a prompt at a CogBot response model;
      analyze, by the algorithm analysis module, the prompt and a current response prepared by the CogBot by:
         generate, by the algorithm analysis module, one or more potential decisions for the prompt, based at least in part on analyzing the prompt and the current response; and
         calculate, by the retraining optimization module, a dialogue benchmark for each of the one or more potential decisions with respect to the current response;
      responsive to a first potential decision for the prompt being above a dialogue benchmark threshold, shift, by the retraining optimization module, the current response to the first potential decision for the prompt, the first potential decision having a highest dialogue benchmark among the one or more potential decisions;
      determine a shift decision score for shifting the current response to the first potential decision; and
      update the retraining shift algorithm of the CogBot response model based at least in part on the shift decision score.

8. The computer system of claim 7, the processor further configured to perform operations to:
   generate a wrong decision score for the prompt, based at least in part on the generated one or more potential decisions; and
   generate a shift probability for the prompt.

9. The computer system of claim 8, wherein determining a wrong decision score further comprises operations to:

generate an unnecessary shift probability, wherein the unnecessary shift probability is a probability the Cog-Bot shifts to a potential decision with a lower dialogue benchmark.

10. The computer system of claim 8, wherein determining a wrong decision score further comprises operations to:

generate a missing shift probability, wherein the missing shift probability is a probability the CogBot fails to shift to a potential decision resulting in a higher dialogue benchmark.

11. The computer system of claim 7, wherein determining a shift decision score further comprises operations to:

configure the one or more potential decisions as a Poisson process, wherein the CogBot has one or more instances to shift into a decision with a dialogue benchmark above a calculated threshold.

12. A computer program product comprising one or more non-transitory computer-readable storage media having program instructions embodied therewith which, when executed by a processor causes the processor to perform a method comprising:

establishing a framework for understanding behaviors of a CogBot having a retraining shift algorithm for continuous, automated improvement and updating the retraining shift algorithm as needed, the framework including an algorithm analysis module and a retraining optimization module;

identifying, within the framework, a prompt at a CogBot response model;

analyzing, by the algorithm analysis module, the prompt and a current response prepared by the CogBot by:

generating, by the algorithm analysis module, one or more potential decisions for the prompt, based at least in part on analyzing the prompt and the current response; and calculating, by the retraining optimization module, a dialogue benchmark for each of the one or more potential decisions with respect to the current response;

responsive to a first potential decision for the prompt being above a dialogue benchmark threshold, shifting, by the retraining optimization module, the current response to the first potential decision for the prompt, the first potential decision having a highest dialogue benchmark among the one or more potential decisions;

determining a shift decision score for shifting the current response to the first potential decision; and updating the retraining shift algorithm of the CogBot response model based at least in part on the shift decision score.

13. The computer program product of claim 12, further causing the processor to perform a method comprising:

generating a wrong decision score for the prompt, based at least in part on the generated one or more potential decisions; and generating a shift probability for the prompt.

14. The computer program product of claim 12, wherein determining a shift decision score further comprises:

generating a missing shift probability, wherein the missing shift probability is a probability the CogBot fails to shift to a potential decision resulting in a higher dialogue benchmark.

15. The computer program product of claim 12, wherein determining a wrong decision score further comprises:

configuring the one or more potential decisions as a Poisson process, wherein the CogBot has one or more instances to shift into a decision with a dialogue benchmark above a calculated threshold.

\* \* \* \* \*